A. TERRY.
ELECTRIC HEATER.
APPLICATION FILED MAR. 21, 1919.
1,319,733.
Patented Oct. 28, 1919.
2 SHEETS—SHEET 1.
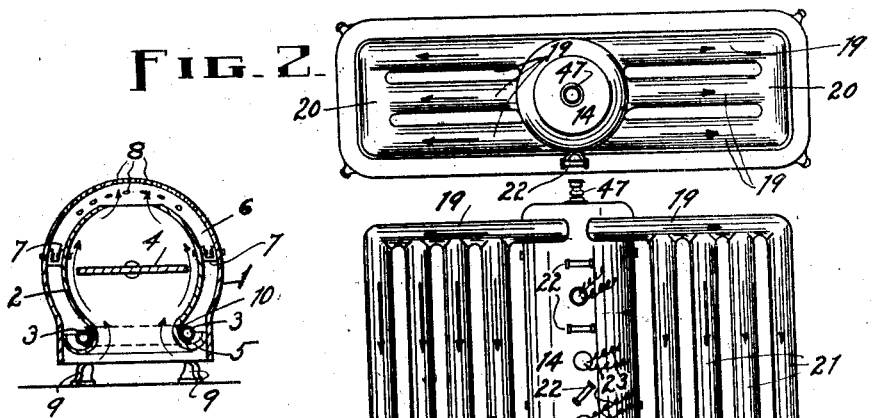
FIG. 2.
FIG. 1.
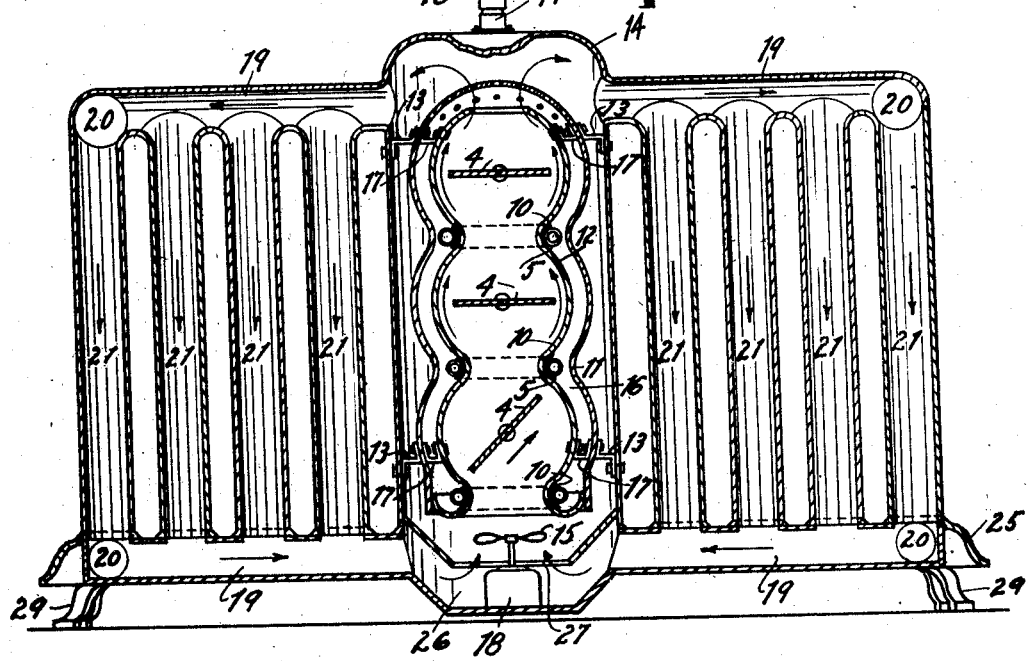
FIG. 3.
FIG. 4.
WITNESS:
C. C. West.
INVENTOR.
Aaron Terry,
BY
Frank A. Cutter,
ATTORNEY.

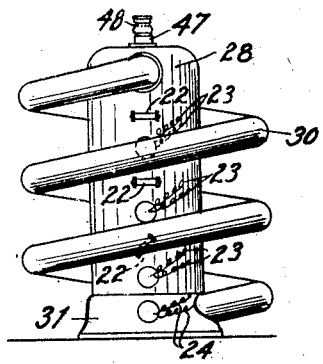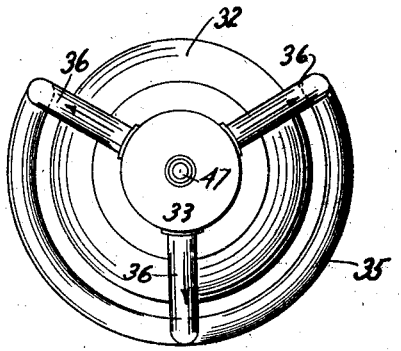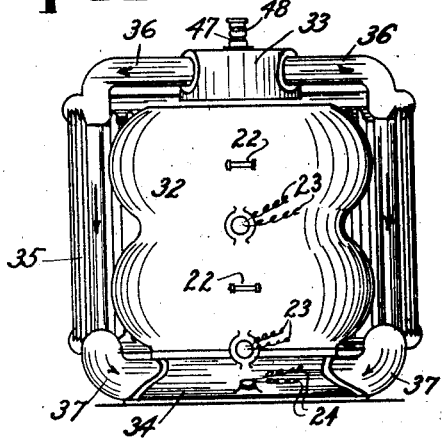

UNITED STATES PATENT OFFICE.

AARON TERRY, OF SPRINGFIELD, MASSACHUSETTS.

ELECTRIC HEATER.

1,319,733.  Specification of Letters Patent.  Patented Oct. 28, 1919.

Application filed March 21, 1919. Serial No. 284,063.

*To all whom it may concern:*

Be it known that I, AARON TERRY, a citizen of the United States of America, and a resident of Springfield, in the county of Hampden and State of Massachusetts, have invented a new and useful Electric Heater, of which the following is a specification.

My invention relates to heaters for buildings which heaters receive their energy from electricity, and consists primarily of a heating unit of peculiar construction, and secondarily of apparatus especially designed for radiating purposes and which contains one or more of such units, all as hereinafter set forth.

Heretofore the cost of converting electrical energy into heat for general use in buildings has been prohibitive, such cost being due to two factors, first, the amount of electricity required to furnish heat at a sufficiently high temperature, and, second, the inadequacy of the radiating mediums employed.

My heater is constructed with the end in view of both quickly absorbing heat from the electricity and radiating such heat, so that the desired results are obtained from a comparatively small amount of electricity. Thus the more important object of my invention is to reduce the amount of electricity required to heat space of a given size and containing air at a given normal or initial temperature, or, to state it in another way, to obtain a greatly increased amount of heat from a given amount of electricity.

The reduction in the amount of electricity required for heating purposes, when the electricity is used with my heaters as the absorbing and radiating medium, is so considerable, and the efficiency of said heater so great, that the cost of heating by electricity is reduced to a point where such heating is available to many who until now have been denied this kind of heat altogether, or have been unable to employ this agency as a heating medium.

Another object is to produce a comparatively simple and inexpensive heater of this character, which is entirely practicable as well as being highly efficient.

The convenience, freedom from dirt, ease of control, and other superior characteristics of an electric heater are too well known to require more than passing notice.

My heater can be installed anywhere, provided the necessary current be available, with very little expense.

Other objects and advantages will appear in the course of the following description.

I attain the objects and secure the advantages of my invention by the means illustrated in the accompanying drawings, in which—

Figure 1 is a central, vertical section through a heating unit which is the nucleus of my invention; Fig. 2, a top plan of a simple form of heater which is a practical embodiment of said invention; Fig. 3, a front elevation of said heater; Fig. 4, an enlarged, central, vertical, longitudinal section through said heater; Fig. 5, an elevation of a modified form of the heater; Fig. 6, a top plan of another modified form of the heater; Fig. 7, a rear elevation of said last-named heater; Fig. 8, a front elevation thereof; Fig. 9, a central, vertical section through still another modified form of heater, and, Fig. 10, an enlarged, central, vertical section through the safety or relief valve that I may use with the several heaters.

Similar reference characters designate similar parts throughout the several views.

The arrows indicate the directions of the air currents.

Referring first to Fig. 1, it will be seen that I have therein illustrated a heating unit which consists of outer and inner shells 1 and 2, respectively, a resistance-coil or other form or type of electrical heating element, which is represented at 3, and a spreader 4. Both the outer and inner shells 1 and 2 are open at the bottom, although the space between the two shells is closed at the base, as by a rolled edge 5 at the base of said inner shell. The shells 1 and 2 are spaced apart, to form a heating chamber 6, by means of the rolled-edge base 5 of the inner shell, and one or more separators 7 in said chamber between said shells. The shell 1 has a plurality of perforations or holes 8 in the top, and the shell 2 opens at the top beneath said holes. The device may be supported from the floor on legs 9.

The shells 1 and 2 are made of very thin sheet-metal which is a good heating medium, such as copper, brass, or the like, and said shells are shaped with the view of promoting the absorption radiation of heat from the heating element 3, the shape of the shell 2 being very similar to that of an inverted globular container which has the usual open, rolling neck, but no bottom, and the shape of the shell 2 not being greatly dissimilar except that the rolling neck is absent.

The electric heating element 3 encircles the neck of the shell 2, at the bottom of the chamber 6, being separated from such neck by an insulating ring 10.

Since the shells 1 and 2 are supported by the legs 9 above the floor, air enters freely the bottom of said shells, passes upwardly through the inner shell and out through the open top thereof into the outer shell, and from the latter through the openings 8. The heating element 3 heats the air in the chamber 6 and the shells 1 and 2, and said shells in turn heat the air in and around them. Thus the air which escapes from the openings 8 is hot and the air which comes into contact with the outside of the shell 1 is heated more or less.

The spreader 4 is of the butterfly-valve type, supported horizontally in the shell 2 in the usual manner, and provided on the outside with a handle, as represented at 22 in some of the other views. The spreader is located in the center of the globular or body portion of the shell 2, and has a diameter which is less than that of the interior of said portion, so that the passage through said shell is never completely closed by said spreader, but there is always a space between the edge thereof and the wall of the shell. The spreader 4 may be rocked, however, to an extent sufficient to permit of the passage of a greater volume of air than can pass said spreader when the latter is normally disposed or even approximates such disposition, or at least of a greater volume of air through the axial center of the shell 2. Unless positioned vertically, the spreader 4 always acts to direct the air which enters the shell 2 outwardly against the sides of said shell, and so assists materially in causing all of the air which enters said shell to be heated. The spreader may be arranged to deflect the air entering the shell 2 more to one side than to the other, without increasing the size of the actual air passage through said shell, or rather without permitting an increased volume of air to pass or to rise in and pass through the axial center of said shell. Thus the spreader may serve as a regulator which is useful in changing the course of the air through the shell 2, and in increasing and decreasing the volume of air that passes through said shell and which rises in and passes through the axial center thereof.

While this heating unit might be utilized in the form shown and described, for heating a room for example, it as a rule will be employed as the nucleus of a heater such as will presently be described. It is clearly to be seen that this unit presents an especially well adapted medium for both taking up and giving off heat from electrical energy.

Generally the heating unit is incorporated in or with a casing having radiating members, and such unit may consist of vertically arranged, globular sections, as best shown in Fig. 4, or a plurality of such units may be arranged side by side, as shown in Fig. 9.

The heating unit illustrated in Fig. 4 comprises outer and inner shells 11 and 12 spaced apart by separators 17 to form a heating chamber 16, each of such shells having three globular parts or sections. This unit has a similar construction at the top and bottom as has the unit previously described. There are three electric-heating elements 3 and the same number of insulators 10, and there are also three air spreaders 4.

The shells 11 and 12 are supported by separators 13 within a vertical casing 14, being spaced from the walls of said casing by said separators. Located within the casing 14 directly under the open bottom of the shell 12 is a fan 15 which is driven by an electric motor 18. Extending from opposite sides of the casing 14, at the top and bottom, are horizontal tubes 19, three of such in this case, which are connected at their outer ends by two upper and two lower, transverse, horizontal tubes 20, and a plurality of vertical tubes 21 connects the said horizontal tubes, all as illustrated in Figs. 2, 3, and 4. These tubes open into each other so that there may be a circulation of air through the same. The casing 14 and the connected radiators which consist of the aforesaid tubes, like the shells 11 and 12, are made of thin sheet-metal which is a good heat conductor.

In Figs. 2 and 3 the handles 22 of the three spreaders 4, with which this heater is supplied, appear; and in Fig. 3 electrical connections for each of the three heating elements 3 in said heater are represented at 23, and electrical connections for the motor 18 in said heater are represented at 24.

The heater has a base 25 and is mounted on legs 29.

In practice, the motor 18 is set in operation and drives the fan 15 to promote circulation throughout the heater, and the current is turned into one or more of the heating elements 3, as may be required. The elements 3 heat the air in the chamber 16 and both shells. The air rises through the shell 12 and through the casing 14 around the shell 11, and such air is heated from said shells. The hot air in the shell 12 escapes, through the openings 8 in the shell 11, into the casing 14 to commingle there with the hot air which rises therein, and from the top of said casing the hot air passes into and through the upper tubes 19 and 20, the vertical tubes 21, and the lower tubes 19 and 20, returning to the bottom of said casing to rise again through the latter and the shell 12. As the air circulates through the heater it heats the tubes and the heat is by them given off into the room. The air thus circulating becomes cool in part, but reheating of the cooled or cooler portion is constantly taking place, and this is a factor which induces circulation, but would usually be of insufficient potency, hence the fan 15 is provided.

The heater is air tight, except for a relief valve which will be subsequently described, and the air therein is at atmospheric pressure approximately, although there will be some fluctuation in this respect due to the artificial raising of the temperature by means of the electrical heating elements. It is on this latter account that the aforesaid relief valve is provided, as will later appear.

Any or all of the spreaders 4 are turned on their axes, by means of the exterior handles 22, to whatever extent may be necessary, from time to time, to regulate the passage of air through the inner shell 12.

The current to the motor 18 and the heating elements 3 can be shut off and again turned on, at any time, as is the case with any ordinary electrical device.

The motor 18 is located in a depressed, annular chamber 26 situated at the base of the casing 14 and into which the bottom tubes 19 open at their inner ends. The cool or cooler air returns through the bottom tubes 19 to the chamber 26, and rises through an opening 27 at the top of said chamber, in the center, into the casing 14 above such top, said air being sucked or drawn and urged upwardly by the fan 15.

The heater shown in Fig. 5 is very similar to that illustrated in the three preceding views, in that it comprises a cylindrical casing 28 with straight walls vertically, and is of practically the same interior construction, but in place of the laterally-extending radiators, as in the other case, there is, in this case, a radiator in the form of a spiral tube 30 that encircles said casing. The tube 30 opens at the upper and lower ends, respectively, into the top and bottom or base 31 of the casing 28. There are a motor and fan in the casing 28, as there are in the casing 14. All of the heaters, in fact, are equipped with means of this kind to promote circulation. The hot air from the casing 28 enters the tube 30 at the top, passes down and around in said tube, and reënters said casing through the base 31. Heat is radiated into the room from both the casing 28 and the tube or radiator 30.

In Figs. 6, 7, and 8 I illustrate a heater in which each shell consists of two globular sections, and there is a casing 32 that follows the outline of the bi-globular sections. The casing 32 has a dome 33 and a base 34. A segmental, tubular radiator 35 partially surrounds the casing 32, and there are three radial tubes 36 at the top and three radial tubes 37 at the bottom of said radiator. The tubes 36 connect the dome 33 with the top of the radiator 35, and the tubes 37 connect the bottom of said radiator with the base 34. The hot air rises in the casing at 32 into the dome 33, and passes from said dome through the tubes 36 into the radiator, through the latter to the tubes 37, and through said last-named tubes into the base 34, from which the air ascends again into said casing.

Instead of increasing the heating-unit factor by increasing the length of the globular shells and the number of globular sections, more than one separate and independent unit may be provided, such units being usually arranged side by side. An example of this appears in Fig. 9, wherein there is a horizontal, instead of an upright as in the other examples, casing 38, a radiator 39 mounted on said casing, a return tube 40 leading from the top of said radiator at one end to the corresponding end of said casing at the bottom, two outer shells 41 arranged side by side, inner shells 42—42 within but spaced from said outer shells, these shells in shape being similar to the shells in the first view, except in certain particulars which will presently be pointed out, heating elements 3 and insulators 10, also spreaders 4, for the two heating units here employed, and a motor 43 and fan 44. The fan 43 is located in the horizontal portion at the base of the return tube 40, to suck and drive the air, which passes from the radiator 39 down through said tube, into the casing 38 beneath the heating units therein. Said units heat the air which rises through and around them, and the air thus heated ascends into the radiator 39, passing from the top of said radiator to the tube 40. The casing 38 and radiator 39 are both heated by the hot air therein and in turn radiate heat into the room.

It will be observed that each of the shells 41, instead of having a plurality of openings at the top, has a single large opening 45 therein, and that the chamber between the shells 41 and 42 in each unit is open at the bottom, as represented at 46. This construction permits air to enter the chamber 6 from below and ascend between the shells 41 and 42 in each unit, and affords a much larger open area at the top for the escape of the air which rises through said unit on both sides of the shell 42. Thus facilities are afforded that are or may be very desirable under or in some and perhaps many conditions or circumstances. The other units may be similarly constructed at either or both top and bottom, and the Fig. 9 units may be constructed at either or both top and bottom like the said other units.

The shells 41 and 42 are suspended in the casing 38, above the floor thereof, on horizontal rods 55 which project inwardly from the walls of said casing.

It is to be understood, of course, that various factors must be taken into consideration and made allowance for, besides the mechanical structure, in order to obtain the best results with my heater. I refer to such factors as the proper amount of electric current, the nature of the heating elements (3), the size of the fan and the rate of speed at which it is driven, the character of the material out of which the shells, casings, and radiators are made, and the size of the air passages, to say nothing of the extremes of temperature to be contended with, and the cubic contents of the space to be heated. Having paid due attention to these factors, however, my heater can be constructed to meet any and all requirements. In this connection it is to be noted that the different types or forms of the heater shown are only a very few of many other possible and practicable types or forms, all of which embody the spirit of my invention. Different conditions necessitate more or less structural change to meet them.

In order to remove any liability on the part of any heater to explode because of excessive internal pressure due to excessive air pressure, in the event the air should be expanded by the heat beyond the point of safety, on the one hand, or any tendency to collapse due to the formation of a partial vacuum, in the event of the escape of air or the sudden cooling of the same, on the other hand, I provide a relief valve, such as that shown in detail in Fig. 10. This valve consists of a vertical casing 47 which is mounted on the heater at some convenient point, and into the bottom of which the heater opens, said casing being perforated at the upper end, as at 48, and having within at an intermediate point an annular valve-in at an intermediate point an annular valve-seat 49, a horizontal valve 50 fitting said seat, a valve-stem 51, and springs 52—52 for said stem. The valve-stem 51 extends above and below the valve 50, through cross-pieces 53—53 within the casing 47 above and below said valve, which center said stem, and the springs 52 extend between the ends of said stem and two other cross-pieces 54 in said casing near the top and bottom thereof. Normally the springs 52 retain the valve 50 in closed relation to the valve-seat 49. The arrangement and construction are such that, when the valve 50 is moved either upwardly or downwardly from closed position, the valve-seat 49 is opened and air can pass through the same around said valve.

If, now, there be an excessive pressure within the casing 47 below the valve 50, the resiliency of the lower spring 52 is overcome, said valve is forced upwardly away from the valve-seat 49, and air escapes through said seat into the upper part of said casing, and passes out through the openings 48, until the pressure decreases to an extent which permits said spring to act to draw down and again close said valve, it being understood that the two springs are of the same strength. Contrariwise, in the event the pressure within the casing 47 below the valve 50 become less than the atmospheric pressure in said casing above said valve, to a degree that permits the force of the upper spring 52 to be overcome, said spring yields and said valve is opened downwardly to permit air to pass down through the valve-seat 49 and reëstablish the equilibrium within the heater. As soon as this equilibrium is again established the upper spring 52 acts through the valve-stem 51 on the valve again to close the valve-seat 49. By means of this relief valve, therefore, all danger of either a blow-out or a collapse is averted.

I do not, of course, intend to restrict myself to the use of the specific form of relief valve described above.

What I claim as my invention, and desire to secure by Letters Patent, is—

1. A heating unit, for an electric heater, comprising globular shells spaced apart to form a heating chamber between, and opening through the top, and an electric-heating element in said chamber encircling the neck only of the inner shell and supported by such neck, said unit being constructed to admit air at the bottom.

2. A heating unit, for an electric heater, comprising globular shells spaced apart to form a heating chamber between, and opening through the top, an electric-heating element in said chamber, and a spreader in the inner shell, said unit being constructed to admit air at the bottom.

3. A heating unit, for an electric heater, comprising globular shells spaced apart to form a heating chamber between, and opening through the top, an electric-heating element in said chamber, and an adjustable spreader in the inner shell, said unit being constructed to admit air at the bottom.

4. A heating unit, for an electric heater, comprising globular shells spaced apart to form a heating chamber between, the inner shell having a neck portion, and both shells opening through the top, and an electric-heating element within said chamber encircling said neck portion, said unit being constructed to admit air at the bottom.

5. An electric heater, comprising a heating unit of stationary elements, a casing therefor, and a connected radiator closed except to said casing.

6. In an electric heater, a heating unit comprising globular shells spaced apart to form a heating chamber between, and opening through the top, and an electric-heating element in said chamber encircling the neck only of the inner shell and supported by such neck, said unit being constructed to admit air at the bottom, and a casing for said unit.

7. In an electric heater, a heating unit comprising globular shells spaced apart at the top and sides to form a heating chamber between, and opening through the top, and an electric-heating element in said chamber encircling the neck of the inner shell, said unit being constructed to admit air at the bottom, a casing for said unit, and a radiator connected with said casing.

8. In an electric heater, a heating unit comprising globular shells spaced apart at the top and sides to form a heating chamber between, and opening through the top, an electric-heating element in said chamber encircling the neck of the inner shell, a casing for such unit, an agitator adjacent to said unit, for the air, and means to operate said agitator.

9. In an electric heater, a heating unit comprising globular shells spaced apart at the top and sides to form a heating chamber between, and opening through the top, an electric-heating element encircling the neck of the inner shell, a casing for such unit, an agitator adjacent to said unit, for the air, means to operate said agitator, and a radiator connected with said casing and closed except to the casing.

10. In an electric heater, a heating unit comprising globular shells spaced apart to form a heating chamber between, and opening through the top, and an electric-heating element in said chamber, said unit being constructed to admit air at the bottom, an agitator adjacent to the bottom of said unit, for the air, means to operate said agitator, and a casing inclosing said unit and agitator.

11. In an electric heater, a heating unit comprising globular shells spaced apart to form a heating chamber between, and opening through the top, and an electric-heating element in said chamber, said unit being constructed to admit air at the bottom, an agitator adjacent to the bottom of said unit, for the air, means to operate said agitator, a casing inclosing said unit and agitator, and a radiator connected with said casing.

12. An electric heater comprising a heating unit of stationary elements, a casing therefor, and a radiator connecting the top of said casing with the bottom of the same and closed except to the casing.

13. An electric heater comprising a heating element, a casing therefor, an agitator adjacent to said element, for the air, means to operate said agitator, and a radiator connecting the top of said casing with the bottom of the same.

14. In an electric heater, a heating unit comprising globular shells spaced apart to form a heating chamber between, and opening through the top, and an electric-heating element in said chamber, said unit being constructed to admit air at the bottom, an inclosure for said unit, and automatic means to stabilize the pressure in said inclosure.

15. A heating unit, for an electric heater, comprising globular shells spaced apart at the top and sides to form a heating chamber between, and opening through the top, and an electric-heating element in said chamber encircling the neck only of the inner shell and supported by such neck.

AARON TERRY.

Witnesses:
F. A. CUTTER,
F. L. WASHBURN.